United States Patent [19]

Sunkle et al.

[11] 4,222,448
[45] Sep. 16, 1980

[54] AUTOMATIC BATCH WEIGHING SYSTEM

[75] Inventors: Thomas H. Sunkle, Newark; John M. Cox, Pataskala, both of Ohio

[73] Assignee: Owens-Corning Fiberglas Corporation, Toledo, Ohio

[21] Appl. No.: 53,495

[22] Filed: Jun. 29, 1979

[51] Int. Cl.³ .................... G01G 19/22; G01G 13/02
[52] U.S. Cl. ........................................ 177/1; 177/70; 177/122
[58] Field of Search .......................... 177/1, 70, 122

[56] References Cited

U.S. PATENT DOCUMENTS

| | | | |
|---|---|---|---|
| 3,528,518 | 9/1970 | Mayer | 177/70 |
| 3,595,328 | 7/1971 | Griem, Jr. | 177/70 X |
| 3,708,026 | 1/1973 | Senour | 177/70 X |
| 3,763,943 | 10/1973 | Bullivant | 177/1 |
| 3,834,473 | 9/1974 | Girard et al. | 177/1 |

Primary Examiner—George H. Miller, Jr.
Attorney, Agent, or Firm—Ronald C. Hudgens; Patrick P. Pacella; Oliver E. Todd, Jr.

[57] ABSTRACT

An improved system and method is disclosed for compounding batches of a plurality of constituents in accordance with a predetermined formula. The individual batch constituents are sequentially fed into a batch receiving hopper. Feeding of each constituent is controlled in response to the current weight of the constituent in the hopper and the current rate at which the constituent is being fed. Preferably, feeding is accomplished at a plurality of decreasing rates with the fastest rate maintained for a maximum time to minimize the total time required to compound the batch.

8 Claims, 5 Drawing Figures

4,222,448

AUTOMATIC BATCH WEIGHING SYSTEM

BACKGROUND OF THE INVENTION

This invention relates to a weighing system and more particularly to an improved method for sequentially compounding predetermined quantities of a plurality of constituents to form a batch.

Various types of batch weighing systems are well known and may be used, for example, to compound a plurality of ingredients which are melted to form glass. In one system, the various batch constituents are individually weighed prior to compounding in a batch receiving hopper. Either a separate scale is used for each constituent or the constituents are individually weighed on a single scale as they are sequentially fed into the batch receiving hopper. The cost of having a separate scale for each constituent may be prohibitively high and the final batch may be inaccurate due to variations between the scales. In either case, the final batch is subject to inaccuracies occurring from the apparatus used for feeding the various constituents to the scales.

In another type of batch weighing system, the various batch constituents are sequentially accumulated in a batch receiving hopper which is mounted either on a fulcrumed weight beam or on a strain guage for determining the weight of the hopper and its contents. The system may be controlled in response to either the total weight of batch constituents accumulated in the hopper or to the weight increment as each constituent is sequentially fed into the hopper. This type of control system is undesirable, however, because weight errors are accumulative. If the system is controlled by using only the weight increment of each successive constituent, accumulative errors are eliminated.

U.S. Pat. No. 3,595,328 discloses an improved automatic batch weighing system for compounding a series of batches containing predetermined measured quantities of various constituents. The constituents for each batch are successfully fed into a batch receiving hopper. The feeding of each constituent is adjusted by estimating the weight of an unpredictable dribble and by compensating for any deviation in the most recent batch compounded for a selected utilizing means to average errors over a series of batches delivered to such utilizing means. Although the system disclosed in this patent is superior to prior art batch weighing systems, it does not use the individual constituent feeders at their maximum efficiency.

SUMMARY OF THE INVENTION

According to the present invention, an improved batch weighing system is provided for compounding a plurality of individual constituents into a batch in a minimum time in order to maximize the throughput of the system. The individual constituents are sequentially fed from supply hoppers into a batch hopper. The batch hopper is mounted on load cells which generate an analog signal proportional to the weight of the compounded ingredients in the batch hopper. This signal is digitized and supplied to a digital computer, preferably a microcomputer, which controls feeding of the individual constituents from the supplied bins. Each constituent is fed from its supplied bin to the batch hopper at at least two different feed rates. As in prior art systems, the feed rate for a constituent is decreased as feeding nears completion to prevent overfeeding of a material. However, in accordance with this invention, the slowing down of the feed rate and finally the stopping of feeding is controlled in response to both the current weight of the constituent accumulated in the batch hopper and the product of the average feed rate and the response time of the feeder when feeding is interrupted. This differs from prior art systems in which control is responsive to the accumulated weight of the material in the batch hopper. By continuously monitoring feed rate, fast feeding may be maintained for a longer period of time than in prior art batch systems, thereby decreasing the time required to compound a batch. After a batch is compounded, it is mixed in a mixing hopper and delivered to a selected utilizing device.

Accordingly, it is an object of the invention to provide an improved system for rapidly and accurately compounding batches of a number of different ingredients.

Another object of the invention is to provide a batch compounding system which reduces the time required for compounding a batch.

Other objects and advantages of the invention will become apparent from the following detailed description, with reference being made to the accompanying drawings.

DESCRIPTION OF THE PREFERRED EMBODIMENTS

Figure 1:
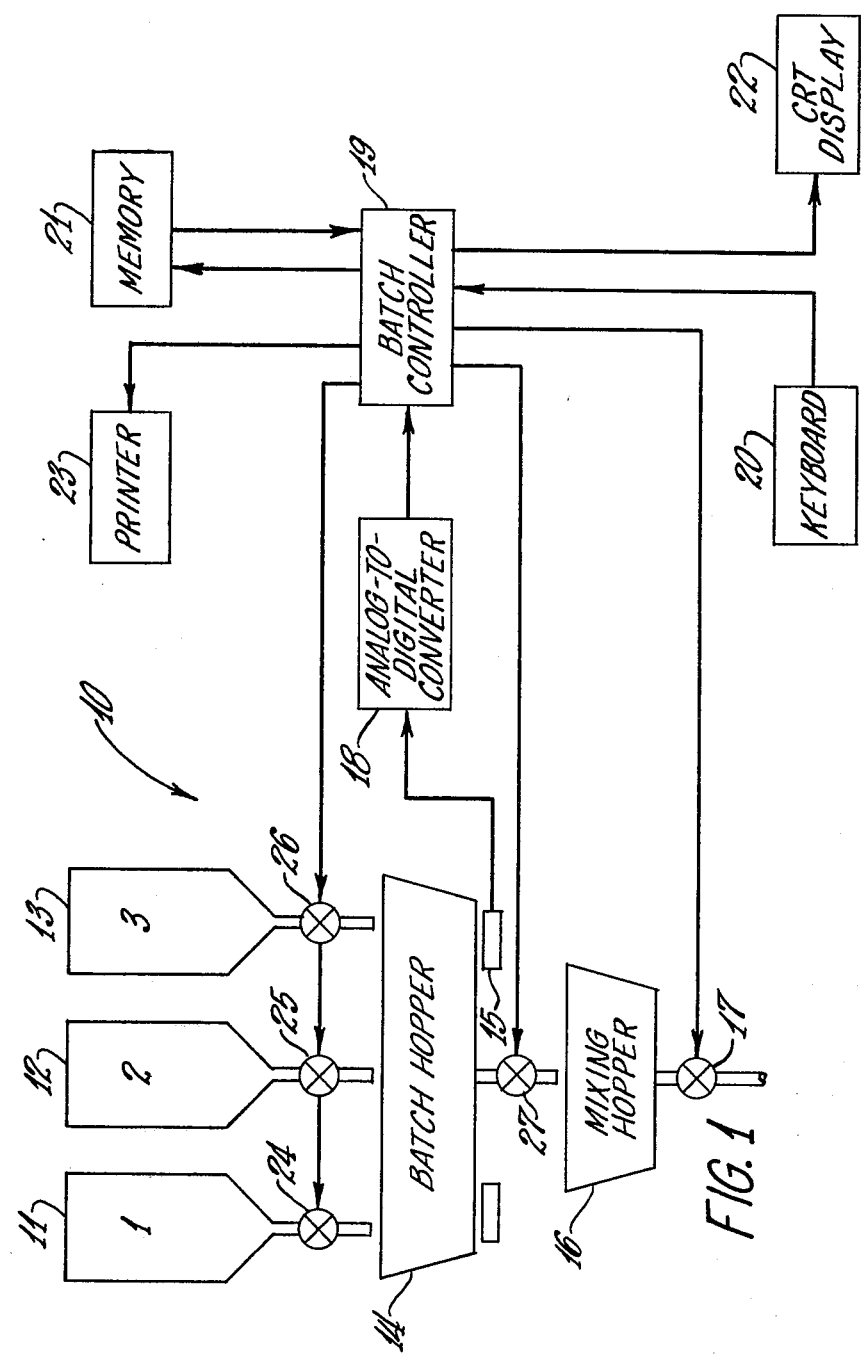
FIG. 1 is a schematic block diagram of apparatus for compounding a batch from a plurality of different constituents constructed in accordance with one embodiment of the invention.

Turning now to the drawings and particularly to FIG. 1, the batch weighing system 10 is illustrated in accordance with one embodiment of the invention. The system 10 is illustrated as having three bins 11–13 which store supplies of first, second and third batch constituents, respectively. Of course, the system 10 will operate with only two bins or with more than the exemplary three bins. The bins are located to feed into a batch accumulating hopper 14 which is mounted on one or more load cells 15. From the batch hopper 14, a compounded batch of the batch constituents in the bins 11–13 is delivered to a mixing hopper 16 and thence through a valve 17 to a conventional distribution system (not shown). The distribution system, for example, may selectively deliver the compounded and mixed batch to storage bins adjacent different utilization devices, such as adjacent different glass melting furnaces.

The load cell 15 generates an analog signal proportional to the weight of the batch hopper 14 and the constituents accumulated therein and is connected to apply this signal to an analog-to-digital converter 18. The converter 18 preferably compensates for the fare weight of the hopper 14 so that a digital signal is generated to indicate only the weight of the compounded batch within the hopper 14. This weight may be indicated on a digital display provided with the converter 18. Such a converter and display, for example, may be a Model 8130 solid state digital indicator produced and sold by Toledo Scale Division of Reliance Electric Company. The digital weight output from the converter 18 is applied to a batch controller 19. The batch controller 19 preferably is a digital computer such as a Texas Instrument Model 990-10 microprocesser with a Model 5TI interface. The batch controller 19 is provided with a permanent program stored in internal read only memories (ROM) and had addition input data supplied from a keyboard 20 and an external memory 21. Output data from the batch controller 19 is supplied to the memory 21, to a cathode ray tube (CRT) display 22, to a printer 23 and to various controls for the supply bins 11-13, the batch hopper 14 and mixing hopper 16 as will be discussed in detail below.

The supply bins 11-13 are provided with feeders 24-26, respectively, for controlling the feeding of batch constituents from the supply bins 11-13 to the batch hopper 14. The feeders 24-26 are of a conventional design and may comprise, for example, an auger driven by a multiple speed motor and an electrically controlled shut off valve. When the first constituent is fed from the supply bin 11 to the hopper 14, the valve in the feeder 24 is initially opened and the auger is driven at a high speed. The high speed is maintained until nearly all of the first constituents required by the formula being compounded is fed into the hopper 14. When feeding is nearly completed, the auger speed is slowed down to prevent overfeeding. Upon termination of feeding, the auger is stopped and the valve is closed to prevent additional material from flowing from the supply bin 11 to the hopper 14. The feeder 25 then is actuated to supply the required amount of the second constituent from the bin 12 to the batch hopper 14 and finally the feeder 26 is operated to supply the required amount of the third constituent from the bin 13 to the hopper 14. After all of the ingredients for a batch are compounded within the hopper 14, the batch controller 19 operates a valve or feeder 27 to transfer the contents of the batch hopper 14 into the mixing hopper 16. The compounded constituents then are thoroughly mixed, whereupon the batch controller 19 operates a valve or feeder 17 to cause distribution of the mixed batch to a selected utilizing device (not shown). Preferably, the batch controller 19 selects a formula for a batch to be compounded and delivers the mixed batch to different utilizing devices on a priority system so that the utilizing device most urgently requiring additional batch material will be serviced first. The utilizing devices may be, for example, batch storage hoppers located adjacent a number of different glass melting furnaces which melt different glass compositions for different uses.

The batch controller 19 is provided with internal memories, such as ROM's which store a fixed program for controlling the apparatus 10. These memories store, for example, the different formulas to be compounded for the different utilizing devices and an algorithm for compounding the batches in the batch hopper 14 in accordance with the stored formulas to a high degree of accuracy in a minimum amount of time. The memory 21 connected to the batch controller 19 stores data and instructions which may be used to modify the data and instructions permanently stored in the ROM's in the batch controller 19. For example, if the first ingredient in the bin 11 is sand and formula stored within the batch controller 19 calls for 600 lbs. of sand, an operator may modify this formula to compound some other weight of sand, such as 610 lbs., by entering this data through the keyboard 20 and causing the data to be stored in the memory 21. The data stored in the memory 21 then overrides the data permanently stored in the batch controller 19. Preferably, the memory 21 is of a type which will retain data even though power may be interrupted to the apparatus 10. If the batch controller 19 and the memory 21 are located in a clean environment, the memory 21 may be of the floppy-disc type. Or, the memory 21 may be a bubble memory when it is not located in a clean environment.

In the past, state of the art batch weighing and compounding systems controlled feeding of the individual batch constituents by comparing the accumulated weight of the constituents in the batch hopper with a desired or formula weight, as modified by various factors. For example, it was necessary to modify the desired weight by a "dribble" factor which was an empirical factor including the amount of material in suspension between the feeder and the batch hopper at the instant the feeder was shut off and also included any material normally knocked loose or released from the feeder when the feeder was shut off. These systems did not take into account the variations in feed rate of a constituent. Some constituents of glass batches, such as clay, have a feed rate which will vary over a wide range due to the tendency of clay to cake or pack in the feeder. Air jets are located within the feeder to attempt to maintain a uniform consistency of the particulate clay as it is fed to the batch hopper. However, if insufficient air is supplied, the clay will tend to cake and pack in the feeder causing a drastic reduction in the feed rate. On the other hand, if too much air is supplied, the clay will fluidize and be extremely difficult to control. The variations in feed rate may cause the feeder to switch too soon from a fast feed rate to a slow feed rate as the final batch weight is approached. If this happens, too much time is required to compound the batch in the batch hopper and the total throughput of the apparatus is significantly reduced.

Figure 2:
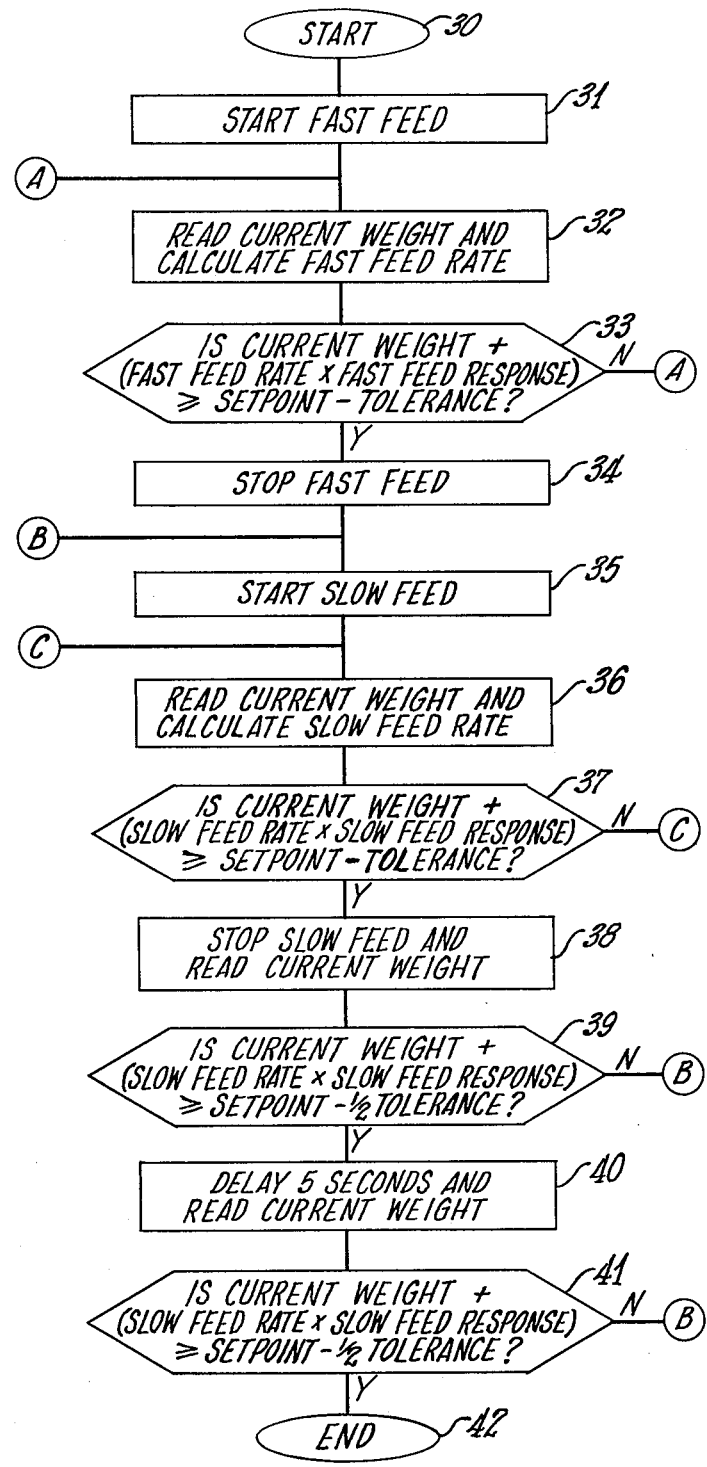
FIG. 2 is a flow chart showing the method of operation of the apparatus of FIG. 1 to compound batch.

Turning now to FIG. 2, a flow chart is shown for the operation of the batch controller 19 for controlling the feeders 24-26 on the bins 11-13. The controller 19 operates the feeders 24, 25 or 26 one at a time until a total batch formula is accumulated within the hopper 14. The flow chart shown in FIG. 2 illustrates the method in which each batch constituent is individually compounded within the hopper 14. Standard flow chart symbols are used in FIG. 2, with rectangular blocks representing execution of a step such as starting of feeding or reading the weight of the constituent accumulated in the batch hopper 14 and the diamond blocks represent a decision made by the batch controller 19. A circled letter to the right of the flow chart represents an exit point which re-enters the chart at the same circled letter on the left of the flow chart.

When an ingredient is to be fed from one of the supply bins 11-13 to the batch hopper 14, the batch controller 19 begins at the block 30 and then at the block 31 starts fast feeding of this ingredient into the batch hopper 14. After feeding is started, the controller 19 reads the current weight of the constituent accumulated in the hopper 14, as taken at the output of the converter 18. Also, the feed rate of the constituent flowing into the batch 14 is calculated from the output of the converter 18. Preferably, the current feed rate is averaged with several prior feed rates and the average is used in controlling feeding. At a block 33, the controller 19 determines whether or not the sum of the current weight plus the product of the fast feed rate times the fast feed response time is greater than or equal to a setpoint of formula weight minus a permissable tolerance in the setpoint weight. The fast feed response is a number which compensates for the material in suspension between the bin supplying the material and the batch hopper at the time fast feeding is interrupted, the amount of the constituent which will fall into the batch hopper when the speed of the feeder is slowed down and a dribble factor occuring when material is knocked loose from the feeder when the feeder screw finally is stopped and the valve is closed. If the sum of the current weight plus the product of the fast feed rate times the fast feed response is not greater than or equal to the difference between the setpoint weight and the permissable tolerance in this weight, then the controller 19 transfers back through point A to the block 32 and the weight is again read and a comparison is made. As soon as the sum is greater than the difference between the setpoint and the tolerance, fast feeding is stopped, as indicated by the block 34. Slow feeding is immediately started, as indicated by the block 35. In the case of a single feed screw driven by a multiple speed motor, the blocks 34 and 35 merely represents slowing down the speed of the feed screw. At this point, the current weight of the accumulated constituent, as indicated at the output of the converter 18, is again read and a slow feed rate is calculated from the output of the converter 18. After the weight is read and the slow feed rate is calculated, the controller 19 determines if the sum of the current weight plus the product of the slow feed rate times the slow feed response time is greater than or equal to the setpoints or formula weight minus the weight tolerance. If it is not, the controller 19 returns along the path C and again reads the weight and calculates the slow feed rate. If it is, the slow feeding is stopped at the block 38 and the current weight is again read from the converter 18. At the time this weight reading is taken, all of the material that was in transit or suspension between the feeder and the batch hopper should be accumulated in the batch hopper. A comparison then is made by the controller 19 to see if the current weight plus the product of the slow feed rate times the slow feed response is greater than or equal to the difference between setpoint and one half the tolerance. If it is not, the controller returns through the path B and restarts slow feeding of the constituent. If it is, the controller 19 waits a predetermined short period of time, such as five seconds, and again reads the current weight appearing at the output of the converter 18, as indicated by the block 40. The short delay in time allows the output of the load cells 15 to stabilize from any motion of the batch hopper 14 caused by the constituent falling into the batch hopper. Another comparison is then made at the block 41 to determine if the sum of the current weight plus the product of the slow feed rate times the slow feed response is greater than or equal to the difference between the setpoint weight and one half the tolerance. If it is not, the controller 19 will again return along the path B to restart slow feeding at the block 35. If it is, feeding of the constituent will be completed to a high degree of accuracy and the controller is finished with the feeding of this constituent, as indicated at 42.

While the algorithm or control cycle illustrated in FIG. 2 is operating, the controller 19 updates the calculated feed rate used in the comparisons at box 33, 37, 39 and 41. The feed rate may be determined each time a weight reading is taken and used for the next comparison. Or, each time the weight reading is taken a feed rate may be calculated and averaged with several prior feed rates. It is preferably to use an average feed rate since momentary variations in the feed rate will not cause the controller 19 to prematurely interrupt feeding. By using an average feed rate and looking at a predicted weight based upon the average feed rate and a response time, the apparatus 10 is capable of compounding a batch more accurately and more quickly than a prior art system which only compares the current weight with a setpoint or formula weight and a dribble factor. The time for compounding a batch is reduced since the present system operates with a shorter slow feed time than the prior art systems.

Figure 3:
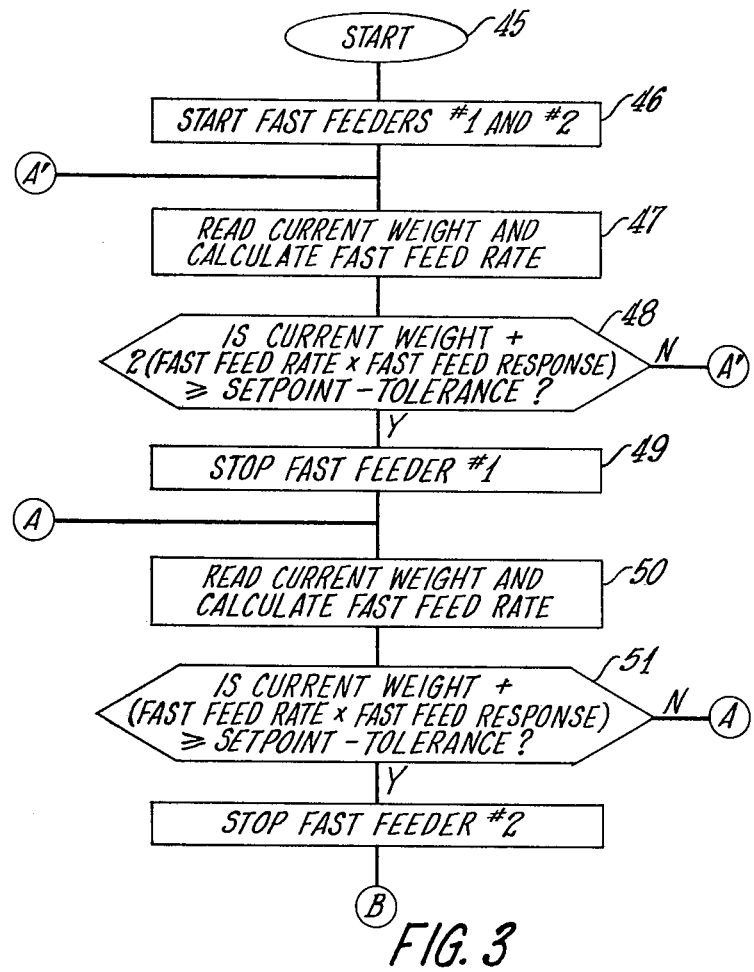
FIG. 3 is a modified embodiment of a portion of the flow chart in FIG. 2.

Turning now to FIG. 3, a variation of the algorithm or control cycle of FIG. 2 is illustrated. The illustrated variation in FIG. 3 replaces the blocks 31–34 in FIG. 2. Each of the batch constituents supply bins is provided with two feeders, one of which operates only at a fast speed and the other which has both a fast speed and a slow speed. The controller enters the weighing cycle at 45 and at a block 46 starts at a fast rate both first and second feeders for a preselected batch constituent bin. After the feeders are started, the current weight of the accumulated constituent in the batch hopper 14 is read from the output of the converter 18 and a total fast feed rate is calculated at a block 47. As previously indicated, the fast feed rate is preferably an average of the present fast feed and several prior calculations of the fast feed rate. After this rate is calculated, the controller 19 determines at 48 if the sum of current weight and twice the product of the fast feed rate times the fast feed response time is greater than or equal to the difference between the setpoint and the setpoint formula weight tolerance. If it is not, the controller 19 returns along the path A' to the block 47 to again read the current weight and calculate the fast feed rate. If it is, fast feeding from the first of the feeders is interrupted at a block 49. The current weight is again read and a fast feed rate is again calculated at a block 50. This fast feed rate will be for the remaining feeder which is operating at a fast feed rate. Next, the controller 19 determines at block 51 if the sum of the current weight and the product of the fast feed rate and the fast feed response time are greater than or equal to the differences between the setpoint or formula weight and the weight tolerances. If it is not, the controller returns along the path A to the block 50 and again reads the current weight. If it is, fast feeding from the second feeder is interrupted at the block 52 and the controller proceeds along the path B (FIG. 2) to start slow feeding, as indicated at the block 35. Through the use of the control cycle or algorithm shown in FIG. 3, as a modification of the cycle in FIG. 2, fast feeding time is further reduced over prior art systems. Two fast feeders initially supply a preselected batch constituent to the batch hopper. One of the fast feeders is shut off just prior to switching the second fast feeder to a slow feed rate. As a consequence, the fast feed time of the consituent is greatly reduced. Furthermore, the slow feed time for completing the feeding of the constituent is minimized since fast feeding was interrupted in response to a predicted feed time rather than in response to the continuously measured current weight as in the prior art.

Figure 4:
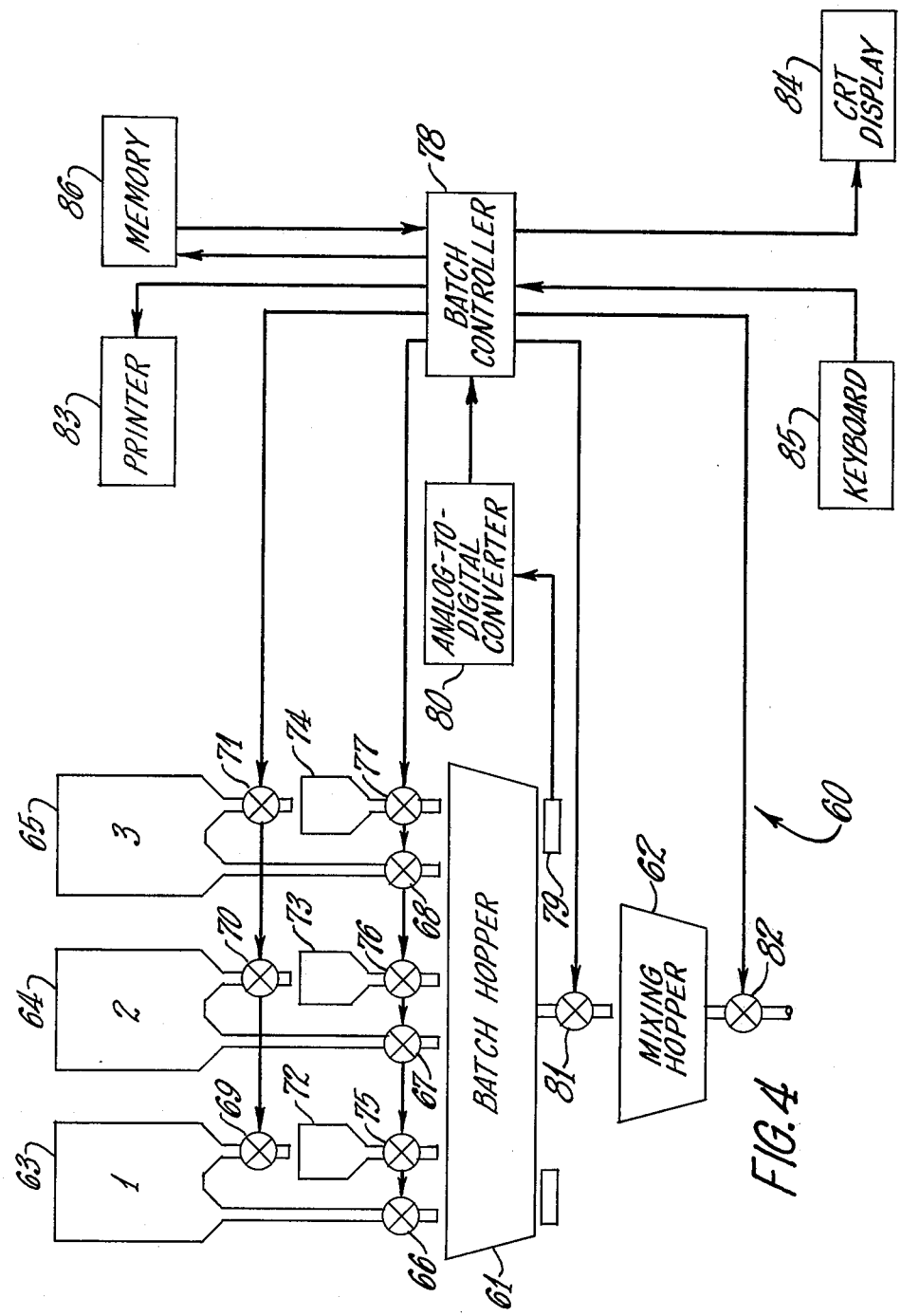
FIG. 4 is a schematic block diagram of a modified embodiment of apparatus for compounding in accordance with the present invention.

Turning to FIG. 4, a modified system 60 is illustrated for compounding batches formed from a plurality of constituents in a batch weighing hopper 61, mixing the compounded batch in a mixing hopper 62 and subsequently delivering the mixed batch to a preselected utilizing device (not shown). Three batch constituents supply bins 63–65 are illustrated position for delivering batch constituents through feeders 66–68, respectively, to the batch hopper 61. The feeders 66–68 may comprise, for example, auger feeders and, preferably, a valve is placed downstream from the auger feeder to prevent any leakage after feeding of the constituent is completed. Each of the batch constituent hoppers 63–65 also are provided with a second feeder 69–71 which feeds into a pre-weight hopper 72–74, respectively. The pre-weight hoppers 72–74 are provided with dump valves 75–77, respectively, for rapidly dumping the contents of such hoppers 72–74 into the batch hopper 61. The pre-weight hopper 72 for the first constituent in the bin 63 is initially filled to a weight slightly less than the formula weight for such constituent. When a batch controller 78 subsequently calls for feeding the first constituent, the dump valve 75 is opened to quickly empty the contents of the pre-weight hopper 72 into the batch hopper 61. The feeder 66 then is activated to complete feeding of the first constituent from the bin 63. The feed rate at which the feeder 66 is initially activated depends upon the amount of the first constituent required to complete the setpoint or formula weight for this constituent. In other words, the feeder 66 may be operated at a fast feed rate, at a slow feed rate or at a jog feed rate wherein the feeder 66 is momentarily pulsed until the final weight for the first constituent is accumulated in the batch hopper 61. Through this arrangement, the feeding time for the first constituent is greatly reduced over that required by prior art batch compounding systems. The batch controller 78 similarly feeds the second constituent first by dumping the contents of the pre-weight hopper 73 through the dump valve 76 and then by activating the feeder 67 and finally feeds the third constituent by dumping the contents of the pre-weight hopper 74 through the dump valve 77 and then activating the feeder 68. While the second and third constituents are fed to the batch hopper 61, the controller 78 operates the feeder 69 to refill the pre-weight hopper 72 to an amount slightly below the setpoint weight for the next batch to be compounded. The pre-weight hoppers 73 and 74 are similarly filled by the batch controller 78 while other constituents are fed into the batch hopper 61.

As in the previously described batch weighing system 10, the system 60 includes one or more load cells 79 mounted to sense the weight of the batch hopper 61. The load cells 79 are connected to an analog-to-digital converter and weight display 80 which in turn supplies a digital weight display to the batch controller 78. Either the converter 80 or the batch controller 78 may compensate for the tare weight of the batch hopper 61 so that the controller 78 only reads the net weight of the batch constituents accumulated in the hopper 61. The controller 78 has outputs connected to control the feeders 66–71, the dump valves 75–77, a dump valve 81 which dumps the contents of the batch hopper 61 into the mixing hopper 62, a distribution system represented by a valve or feeder 82 which delivers the mixed batch from the mixing hopper 62 to a selected utilizing device, a printer 83 and a cathode ray tube display 84. In addition to weight input from the converter 80, the batch controller 78 also has input and output connections to an auxiliary memory 86. The memory 86 may be, for example, a floppy-disc memory or a bubble type memory or any other suitable nonvolatile read and write memory. The primary considerations are that the memory 86 operate in the environment in which the systems 60 is located and that the memory 86 should retain data even though power to the system 60 is interrupted.

Figure 5:
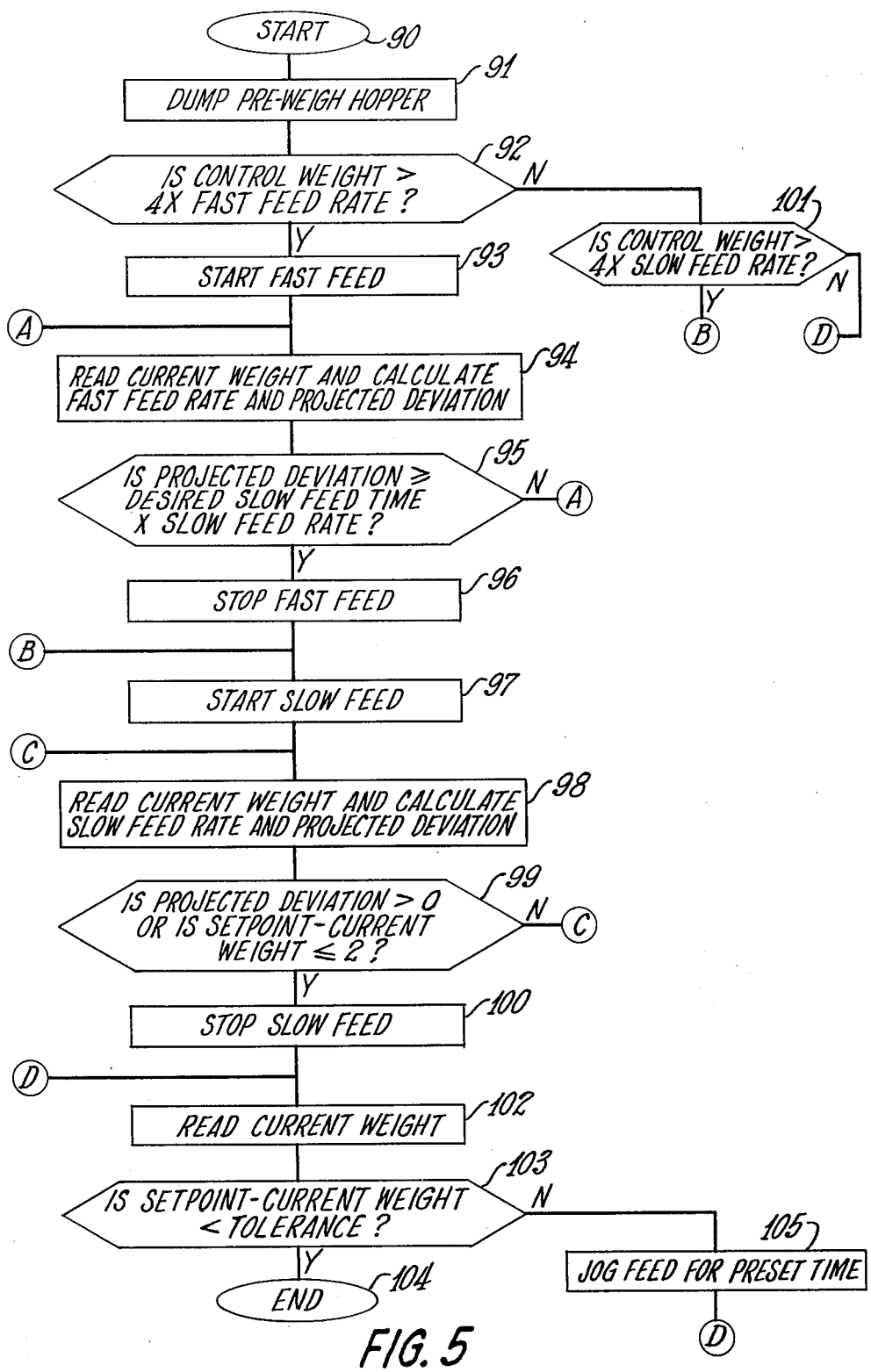
FIG. 5 is a flow chart illustrating a preferred method of operation of the apparatus of FIG. 4 to compound a batch.

Turning now to FIG. 5, a flow chart is shown for the operation of the batch controller 78 in weighing one of a plurality batch constituents into the batch hopper 61. The cycle initially is started at a "start" block 90. At a block 91, the contents of the pre-weight hopper, such as the hopper 72 if the first constituent is being fed, are dumped into the batch hopper 61. At a block 92, the batch controller 78 determines whether or not feeding should be initiated at a fast feed rate. The batch controller calculates a control weight by subtracting the weight of the material dumped from the setpoint or the formula weight. The control weight then is compared with a predetermined multiple of the average fast feed rate, such as four times the fast feed rate. If the control weight is greater than, for example, four times the fast feed rate, then fast feeding is started at a block 93. The current weight in the batch hopper 61 is read from the output of the converter 80 and a new average fast feed rate is calculated at a block 94. The batch controller also calculates a projected deviation (P) from the setpoint or formula weight if the feeder is stopped at this instance. The projected deviation is calculated by the summation of the current weight plus the product of the current feed rate times the current response time plus a dribble factor less the setpoint for formula weight for the constituent being fed. As used herein, response times includes any material following from the feeder when the feeder auger is stopped. Dribble, on the other hand, accounts for material falling or knocked loose when the valve downstream of the auger is closed.

After the projected deviation is calculated, a comparison is made at a block 95 to determine whether or not fast feeding should be continued or interrupted. If the projected deviation is less than the product of a desired slot feed time times an average slow feed rate, then a transfer is made along the path A batch to the block 94 and the current weight is again read and the fast feed rate and the projected deviation are recalculated from the new current weight. If the projected deviation is greater than or equal to the product of the desired slow feed time times the average slow feed rate, then fast feeding is interrupted at a block 96. Slow feeding is immediately started, as indicated by a block 97 and then at a block 98 the current weight is read again and a slow feed rate and a projected deviation are calculated. This data is used at a block 99 to determine whether or not slow feeding should be interrupted or maintained. Slow feeding will continue by transferring along the path C back to the block 98, unless the projected deviation is greater than 0 or the difference between the setpoint and formula weight plus the current weight is less than or equal to some predetermined small number, such as 2 minimum scale graduations from the output of the converter 80. If this occurs, slow feeding is interrupted at a block 100. The comparisons at the block 99 of the difference between the setpoint formula weight and the current weight with a predetermined small number prevents overfeeding if, for example, there is a partial clog of a feeder and the feeder should suddenly break loose and feed at a faster rate.

At the beginning of the control cycle, a comparison was made at the block 92 to determine whether or not feeding should be initiated at a fast feed rate. If the control weight was sufficiently close to the fast feed rate, then fast feeding was not started. At this point, a comparison is made at a block 101 between the control weight and a predetermined multiple of a slow feed rate. If the control weight is greater than four times the slow feed rate, for example, then slow feeding is initiated by transferring along a path B to the block 97 wherein slow feeding is initiated. If the control weight is not greater than this multiple or some other predetermined multiple of the slow feed rate, then a transfer is made along a path D to a block 102. A transfer also is made to the block 102 after slow feeding is stopped at the block 100. At this point, the current weight is read. A comparison is made between the permissible tolerance and the final weight of the constituent accumulated in the hopper 61 and the difference between the setpoint and current weights. If the difference between the setpoint and current weights are less than the tolerance, then feeding is completed, as indicated by the block 104. If the difference between the setpoint and current is not less than a permissible tolerance, then jog feeding takes place at a block 105. Jog feeding is accomplished merely by turning the auger feeder on for a predetermined short time interval, such as one or two seconds. A transfer then is made along the paths D back to the block 102 and the current weight is read again. A comparison is made at 103 and the jog feeding is repeated until the difference between the setpoint and current weight is less than the permissible tolerance and the final weight, at which time feeding of the constituent is complete.

It should be appreciated from the description of the system 60 that batch time is greatly reduced from prior art systems for compounding batches of predetermined constituents in accordance with a formula. Furthermore, the batches are compounded to a considerably higher degree of accuracy than in the past. The time required to feed each constituent is greatly reduced by using a pre-weight hopper. Furthermore, the fast time is maximized and the slow feed time is minimized by comparing a projected deviation time with the product of a desired slow feed time times an average slow feed rate to determine when to stop fast feeding. Feeding also is maximized by having the batch controller 78 compute a new fast feed rate or a new slow feed rate each time the current weight of a constituent within a batch hopper 61 is read. Preferably, the computed feed rate is a weighted average of several readings. For example, the average slow feed rate may be computed as the sum of three times the previous average slow feed rate plus the latest slow feed rate divided by four. If desired, a number considerably smaller than the slow feed rate may be added to this, such as the number 1. This prevents the average slow feed rate from going to 0 in the event that feeding should stop due to a blockage. It also assures that the indicated average slow feed rate will be slightly higher than the actual feed rate so that slow feeding will be stopped slightly early to reduce the risk of overfeeding to a constituent.

It will be appreciated that various changes and modifications may be made to the above described preferred embodiments of a batch weighing system without departing from the spirit and scope of the following claims.

We claim:

1. A method of compounding a batch containing predetermined setpoint weights of each of a plurality of constituents comprising the steps of: initiating feeding of a first of said constituents into a batch receiver at a predetermined fast rate; periodically measuring the current weight of said first constituents accumulated in said batch receiver and calculating a feed rate for such constituent; slowing the feeding of such constituent to a predetermined slow rate when the sum of the current weight plus the product of the calculated fast feed rate times a fast feed response is at least equal to the setpoint weight for such constituent less a permissible tolerance and such setpoint weight; interrupting feeding of such constituent when the sum of the current weight plus the product of the calculated slow feed rate times a slow speed response is at least equal to the setpoint weight for such constituent less a permissible tolerance in such setpoint weight; and similarly successively feeding the remainder of said plurality of constituents into said batch receiver to complete compounding of a batch.

2. A method for compounding the batch, as set forth in claim 1, and, after the feeding of each constituent is interrupted, further including the step of restarting the feeding of said constituent at a slow feed rate when the sum of the current weight of such constituent in said batch receiver plus the product of the previously calculated slow feed rate times the slow feed response is less than the setpoint weight for such constituent less a predetermined portion of a permissible tolerance for such constituent.

3. A method for compounding a batch, as set forth in claim 1, further including the steps of dumping a pre-weighed quantity of a constituent less than the setpoint weight of such constituent into said batch receiver prior to initiating feeding of such constituent.

4. A method for compounding a batch, as set forth in claims 1, 2 or 3, wherein each time a feed rate is calculated an average feed rate is calculated.

5. A method for compounding a batch containing predetermined setpoint weights of each of a plurality of constituents comprising the steps of: initiating feeding of a first of said constituent into a batch receiver at a predetermined fast rate when the remaining portion of the setpoint weight for such constituent not in said batch receiver is greater than a preselected multiple of the fast feed rate for such constituent; peridically reading the current weight of such constituent in said batch receiver and calculating the fast feed rate for such constituent and a projected deviation of such constituent in said batch receiver from the setpoint weight if fast feeding is interrupted; interrupting fast feeding and starting slow feeding of such constituent at a predetermined slow rate when the calculated projected deviation is at least equal to the product of a desired slow feed time times the slow feed rate; feeding the remainder of such constituent setpoint weight into said batch receiver; and similarly successively feeding the remainder of said plurality of constituents into said batch receiver to complete compounding of a batch.

6. A method for compounding a batch, as set forth in claim 5, wherein the remainder of each constituent is fed by feeding at said slow rate until the projected deviation for such constituent is greater than 0 and by subsequently feeding small amounts of such constituent until the difference between the setpoint weight for such constituent and the accumulated weight of such constituent and said batch receiver is less than a predetermined permissible tolerance in such setpoint weight.

7. A method for compounding a batch, as set forth in claims 5 or 6, and further including the step of dumping a pre-weighed quantity of a constituent less than the setpoint weight of such constituent into said batch receiver prior to initiating feeding such constituent.

8. A method for compounding a batch, as set forth in claim 7, and further including the step of initiating feeding of a constituent into said batch receiver at a slow feed rate when fast feeding is not initiated and the remaining portion of the setpoint weight for such constituent not in said batch receiver is greater than a preselected multiple of the slow feed rate for such constituent.

* * * * *